United States Patent [19]
Toda et al.

[11] Patent Number: 5,313,781
[45] Date of Patent: May 24, 1994

[54] GASIFICATION-COMBINED POWER PLANT

[75] Inventors: Hiromichi Toda; Shigeyasu Ishigami; Norihisa Kobayashi; Takaaki Furuya, all of Tokyo; Jun Izumi, Nagasaki, all of Japan

[73] Assignee: Mitsubishi Jukogyo Kabushiki Kaisha, Tokyo, Japan

[21] Appl. No.: 861,525

[22] Filed: Apr. 1, 1992

[30] Foreign Application Priority Data

Apr. 2, 1991 [JP] Japan .................. 3-096396

[51] Int. Cl.⁵ .............................................. F02C 3/28
[52] U.S. Cl. .................... 60/39.12; 96/130; 96/143
[58] Field of Search ........... 60/39.02, 39.12; 55/73, 55/75

[56] References Cited

U.S. PATENT DOCUMENTS

| | | | |
|---|---|---|---|
| 3,974,256 | 8/1976 | Wheelock et al. | 55/73 |
| 3,990,229 | 11/1976 | Staege | 60/39.12 |
| 4,440,551 | 4/1984 | Henning et al. | 55/75 |
| 4,696,680 | 9/1987 | Ghato et al. | 55/75 |
| 4,779,412 | 10/1988 | Deinert | 60/39.12 |
| 4,833,877 | 5/1989 | Ahland et al. | 60/39.12 |

*Primary Examiner*—Louis J. Casaregola
*Attorney, Agent, or Firm*—McAulay Fisher Nissen Goldberg & Kiel

[57] ABSTRACT

The gasification-combined power plant of the present invention has a structure wherein a fuel gas is generated by partially oxidizing a carbon-containing fuel 2 with an oxygen-containing gas 3 in the gasification apparatus 1, the sensible heat of the fuel gas is recovered by the heat exchanger 4, char and dust are removed from the fuel gas by the dust collector 5, trace gas components, such as $H_2S$ and $NH_3$, are simultaneously removed from the waste gas by the gas separation apparatus 6 based on dry physical adsorption of these components (for example, by a pressure swing adsorption method), the thus separated and removed gas containing high concentrations of trace gas components, such as $H_2S$ and $NH_3$, is denitrated and desulfurized by the gas disposal apparatus 7 and then is discharged from the chimney 13 into the atmosphere. With the simultaneous removal of the trace gas components at a high temperature from the fuel gas produced by the gasification apparatus, this plant simultaneously achieves both a high heat efficiency for the gasification-combined power plant as a whole and the reduction of sulfur oxides and nitrogen oxides in the combustion waste gas from the gas turbine.

3 Claims, 4 Drawing Sheets

GASIFICATION-COMBINED POWER PLANT

FIELD OF THE INVENTION AND RELATED ART STATEMENT

The present invention relates to a gasification-combined power plant and more particularly to a gasification-combined power plant having a gas cleanup apparatus which simultaneously removes trace gas components, such as hydrogen sulfide and ammonia, from a fuel gas which is generated by a gasification apparatus at a high temperature preferably more than 350° C., more preferably at about 400° C. The gas cleanup apparatus of the present invention is not restricted to use in gasification-combined power plants, but may also be used as equipment for cleaning up gases in connection with a wide variety of processes which produce reductive gases (CO, $H_2$ and the like) from carbon-containing fuels, such as coal and heavy oil.

FIG. 5 shows an example of conventional gas cleanup apparatuses in gasification-combined power plants. The apparatus operates based upon a wet cleanup method in which hydrogen sulfides, ammonia and the like are chemically absorbed using an absorbent, such as lime-gypsum, soda, and magnesium hydroxide, to name a few representative examples.

In FIG. 5, reference numeral 1 refers to a gasification apparatus. In the gasification apparatus 1, a carbon-containing fuel 2, such as coal or heavy oil, is partially oxidized with an oxygen-containing gas 3 at a high temperature and under a high pressure. A high-temperature fuel gas generated by the gasification apparatus 1 is cleaned of dust by a scrubber 51, cooled by a gas/gas heat exchanger 52, then desulfurized by a wet cleanup apparatus 53, heated by the gas/gas heat exchanger 52 again, and thereafter forwarded to a combustor 9 of a gas turbine 8. Reference numeral 54 refers to a sulfur recovery apparatus.

Furthermore, as illustrated in FIG. 5, the fuel gas is subjected to combustion inside the combustor 9 along with air supplied from an air compressor 10, and the gas turbine 8 is driven by the combustion gas to rotate a generator 11. The high-temperature gas from the outlet of the gas turbine 8 is forwarded to an exhaust heat recovery boiler 58 (not shown) wherein the heat is recovered.

In a gasification-combined power plant having the above-described conventional cleanup apparatus, water is introduced into the scrubber 51 to cool down the high-temperature fuel gas and evaporates, whereby the sensible heat of the fuel gas is lost and thus the thermal efficiency of the plant decreases to a great extent. For a higher efficiency operation of the plant, the gasification-combined power plant has to have a system for cleaning up the fuel gas at a high temperature and in a dry manner, so that the sensible heat of the fuel gas can be used by the gas turbine 8.

FIG. 6 shows a dry type cleanup apparatus which works at a high temperature as an example of variation of conventional cleanup systems in gasification-combined power plants. As illustrated in FIG. 6, being generated by partially oxidizing the carbon-containing fuel 2 with the oxygen-containing gas 3 at high temperatures and under high pressures in the gasification apparatus 1, the high-temperature fuel gas is cleaned of char and dust by a dust collector 5, and then removed of hydrogen sulfides by a dry cleanup apparatus 55, and forwarded to a low $NO_x$ combustor 9, of the gas turbine 8. Reference numeral 56 refers to a sulfur recovery apparatus.

The dry cleanup apparatus operates based on chemical absorption using iron oxide as an absorbent and removes hydrogen sulfides according to the following reactions:

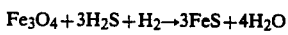

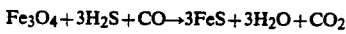

These reactions are incapable of decomposing or removing ammonia which results from nitrogen components present in the carbon-containing fuel 2 or in the oxygen-containing gas 3 during the gasification reaction processes. Thus, it is necessary to provide additional means for preventing ammonia from transforming into nitrogen oxides during the combustion processes in the gas turbine 8, and for reducing and decomposing the thus-produced nitrogen oxides at a cleanup apparatus 57 incorporated into the exhaust heat recovery boiler 12. Therefore, for the conventional case illustrated in FIG. 6, the environmental protection requires several stages of measures: the dry cleanup apparatus 55, the low $NO_x$ combustor 9, and the wet cleanup apparatus 57.

In FIG. 6, the fuel gas burns inside the low $NO_x$ combustor 9' along with the air supplied from the air compressor 10, and the gas turbine 8 is driven by the combustion gas to rotate the generator 11. The high-temperature gas from the outlet of the gas turbine 8 is transferred to the exhaust heat recovery boiler 12 wherein the heat is recovered, and discharged from a chimney 13 into the atmosphere. Also, steam produced respectively at the exhaust heat recovery boiler 12 and the gasification apparatus 1 is put together and introduced into a steam turbine 14, and drives this steam turbine 14 and thus the generator 15.

As described above, the following problems are incidental to conventional apparatuses for cleaning up fuel gases in gasification-combined power plants.

According to the wet cleanup illustrated in FIG. 5, during the process of cooling a fuel gas at the scrubber 51, ammonia and the like can be dissolved into scrubbing water and removed, but a large amount of the scrubbing water containing nitrogen components has to be disposed of. Further, the sensible heat of the fuel gas is lost due to the evaporation of water at the scrubber, and therefore the heat efficiency is low for a gasification-combined power plant as a whole.

Also, the dry cleanup illustrated in FIG. 6 wherein iron oxide is used as the absorbent is for cleanup at high temperatures, and therefore makes it possible to efficiently use the sensible heat of the fuel gas for driving the gas turbine and improve the thermal efficiency of a gasification-combined power plant. With this method, however, ammonia contained in the fuel gas cannot be decomposed or removed. Therefore, nitrogen oxides are formed during the combustion processes in the gas turbine 8, and it is necessary to provide means of reducing nitrogen oxides.

OBJECT AND SUMMARY OF THE INVENTION

The present invention has been made in order to find a solution for these problems in the related art. An object of the present invention is to simultaneously remove all trace gas components, i.e., gas components present in small quantities, such as hydrogen sulfide and ammonia, from a fuel gas produced in a gasification apparatus at a high temperature and simultaneously achieve both an improvement of the thermal efficiency of a gasification-combined power plant and a reduction of sulfur oxides and nitrogen oxides in a combustion waste gas from a gas turbine.

In order to provide a solution for above-mentioned problems, the present invention provides a gasification-combined power plant which comprises: a gasification apparatus for partially oxidizing a carbon-containing fuel, such as coal and heavy oil, with an oxygen-containing gas at a high temperature and under a high pressure; a gas turbine driven by burning a high-temperature fuel gas generated in the gasification apparatus; an exhaust heat recovery boiler for recovering heat from a high-temperature gas discharged from an outlet of the gas turbine; a steam turbine driven by steam which is produced by the heat recovered respectively from the gasification apparatus and from the exhaust heat recovery boiler; a cleanup apparatus for purifying at a high temperature (preferably at a temperature of not less than 350° C., more preferably at about 400° C.) the high-temperature fuel gas generated in the gasification apparatus, which gas cleanup apparatus being positioned downstream from the gasification apparatus; a dust collector for removing char and dust from the fuel gas; and a gas separation apparatus for simultaneously removing trace gas components, such as hydrogen sulfide and ammonia, from the fuel gas according to dry physical adsorption, which gas separation apparatus being positioned downstream from the dust collector.

According to the above-mentioned apparatus, a gas separation apparatus based on dry physical adsorption which is operational under a high pressure and at a high temperature is disposed between the dust collector and the gas turbine, so that gas separation becomes possible under a high pressure and at a high temperature. Therefore, the sensible heat of the fuel gas can be effectively used by the gas turbine. Thus, the heat efficiency of gasification-combined power plants can be improved.

In addition, trace gas components, such as hydrogen sulfide and ammonia, are removed simultaneously while they are still in the fuel gas, and therefore means of disposing of nitrogen oxides and a denitration apparatus for the gas turbine can be dispensed with in the downstream.

Furthermore, it is also unnecessary to dispose of a large amount of nitrogen components which would otherwise be mixed into the waste water of the scrubber under the wet cleanup method.

Still further, the separated and removed gas containing high concentrations of hydrogen sulfides, ammonia and the like accounts for approximately 2 to 8% of the fuel gas in terms of gas volume, and such a small amount of the separated gas can be disposed of by a simple gas disposal apparatus. Also, because the gas to be treated is in small amounts, even if it is done by a wet cleanup method (e.g., a wet lime-gypsum desulfurization method), the treatment does not affect the heat efficiency of the plant very much.

DETAILED DESCRIPTION OF PREFERRED EMBODIMENTS

One embodiment of the present invention will now be described in detail with reference to the drawings.

Figure 1:
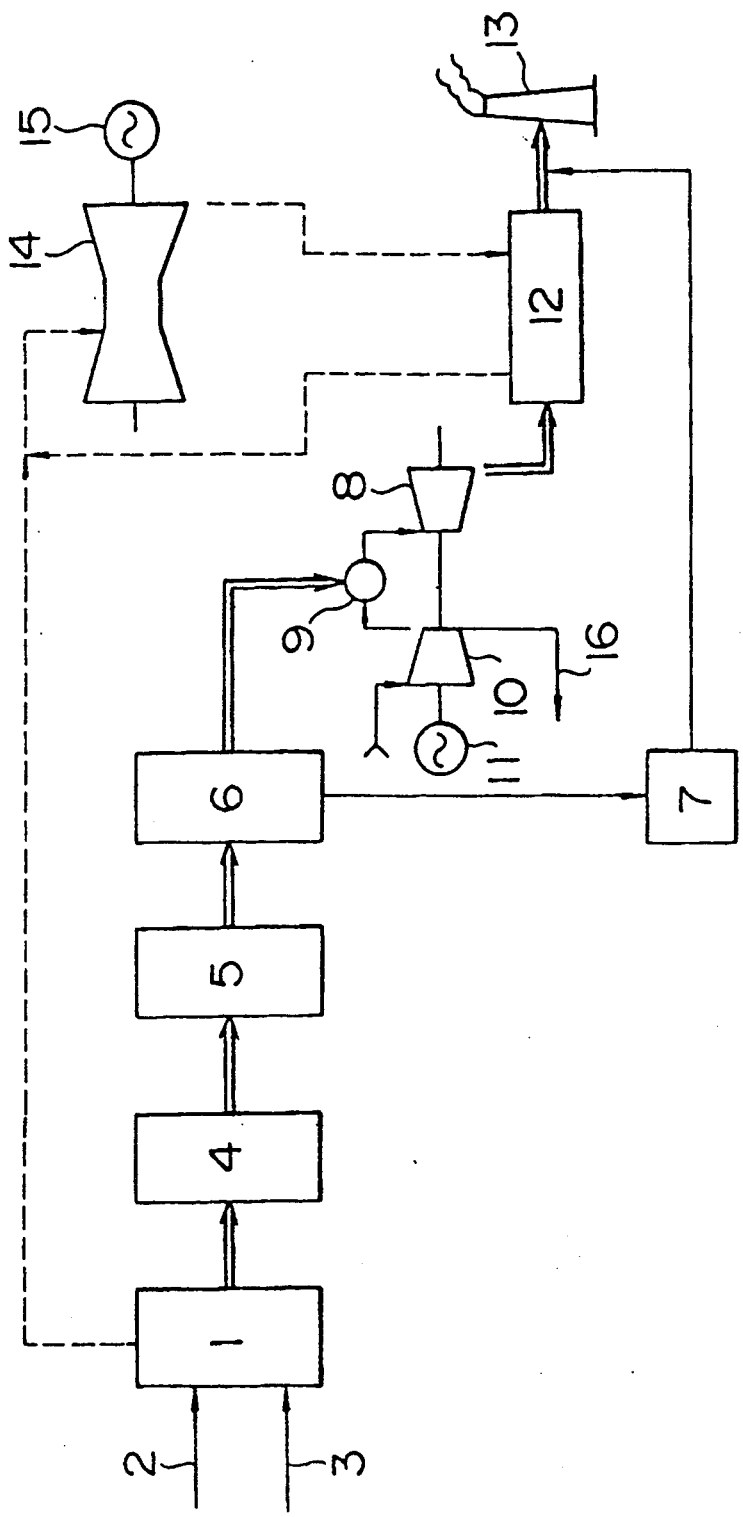
FIG. 1 is a flow diagram showing the organization of a gasification-combined power plant according to one embodiment of the present invention.
Figure 5:
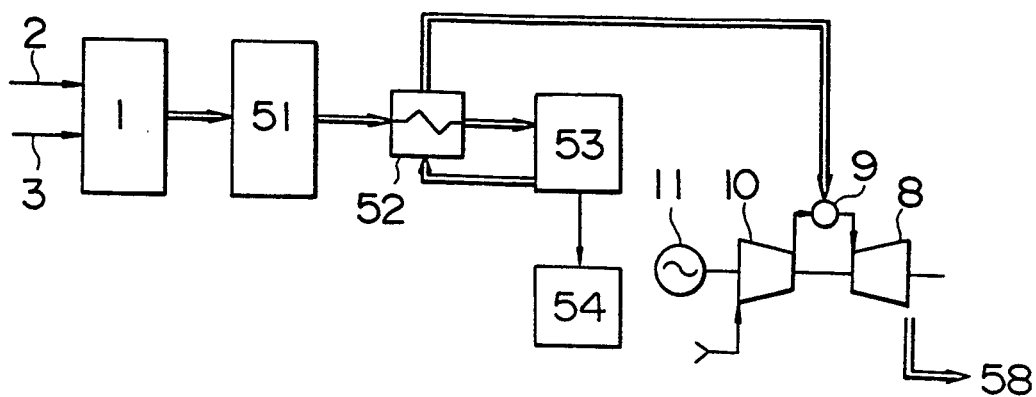
FIG. 5 is a diagram showing one example of related art.
Figure 6:
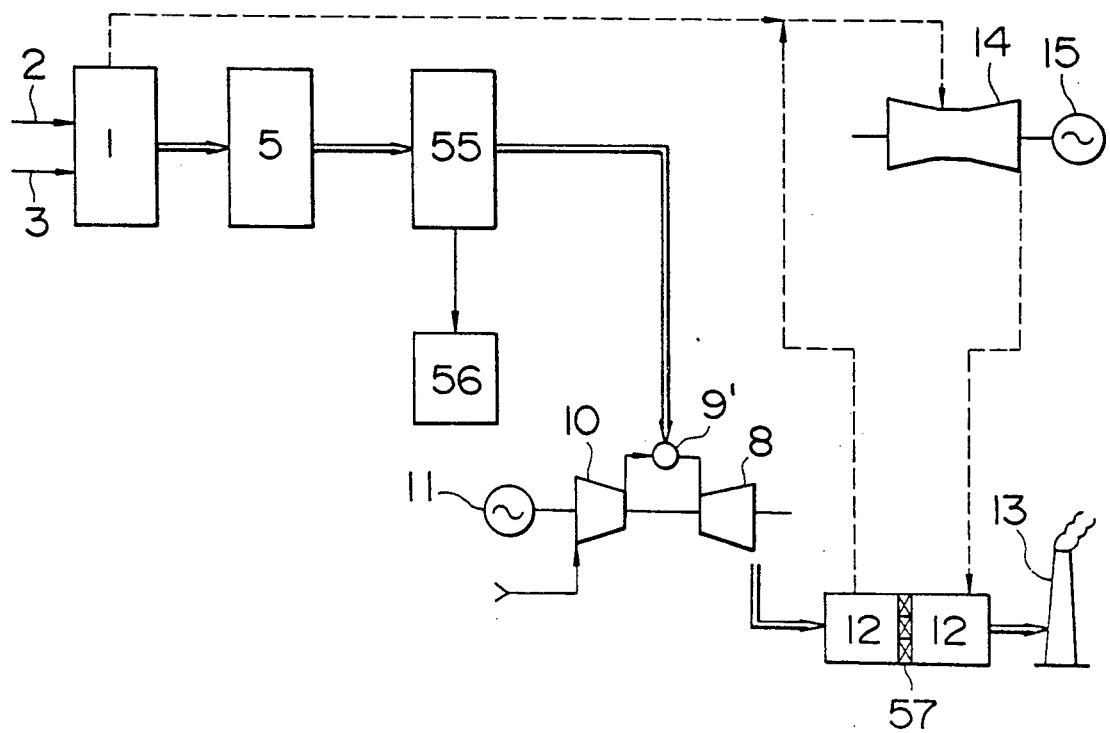
FIG. 6 is a diagram showing another example of related art.

A gasification-combined power plant according to the present embodiment is shown in FIG. 1, wherein the same numerals refer to same parts as in FIGS. 5 and 6 to avoid redundant descriptions.

As illustrated in FIG. 1, a heat exchanger 4 is positioned between a gasification apparatus 1 and a dust collector 5, and a gas separation apparatus 6 between the dust collector 5 and a combustor 9 of a gas turbine 8. The heat exchanger 4 recovers the sensible heat from the high-temperature fuel gas generated in the gasification apparatus 1.

The gas separation apparatus 6 operates based on dry physical adsorption for simultaneously removing trace gas components, such as hydrogen sulfide and ammonia, from the fuel gas which has been cleaned of char and dust by the dust collector 5.

Figure 2:
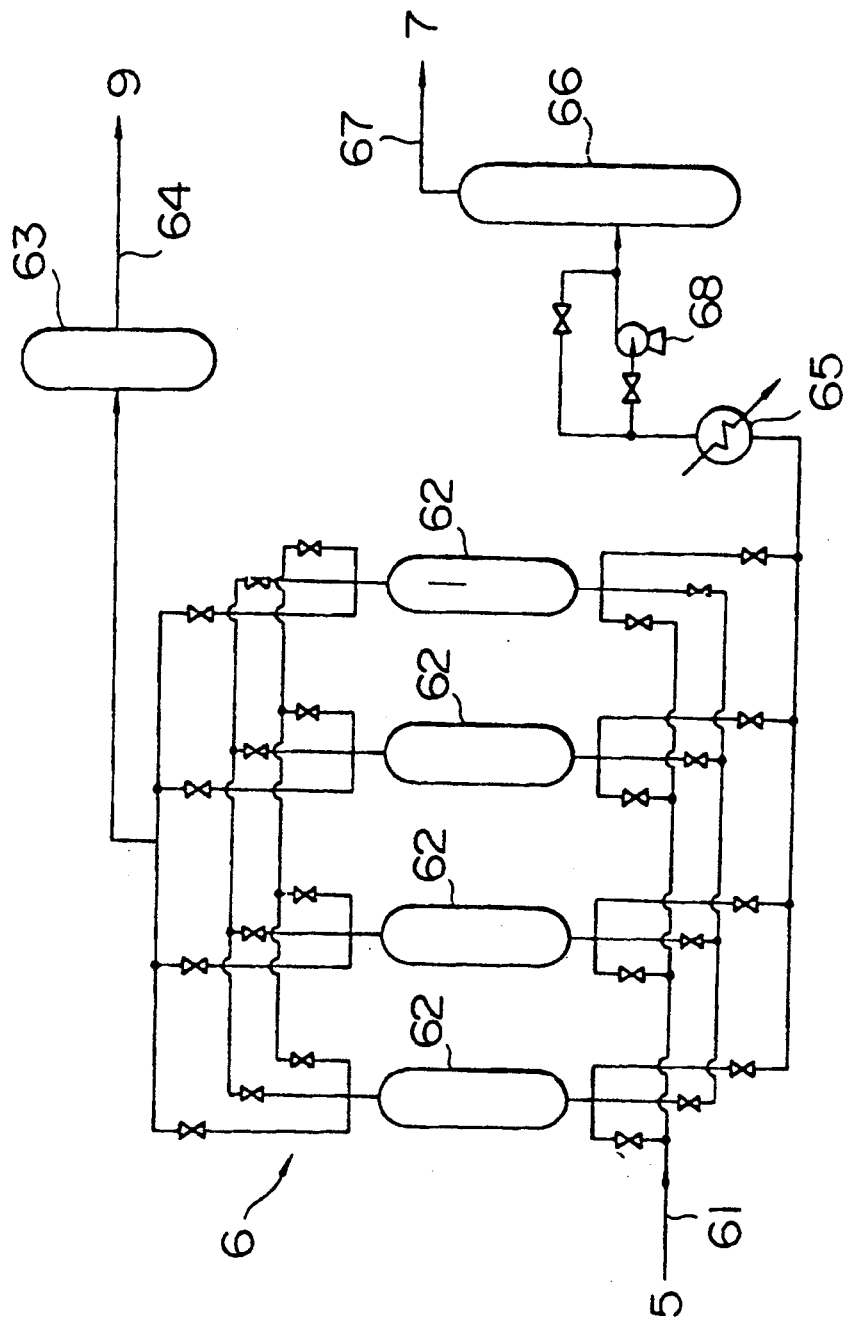
FIG. 2 is a diagram describing in detail the structure of a gas separation apparatus 6 in FIG. 1.

The gas separation apparatus 6 has a structure the detail of which is illustrated in FIG. 2, and comprises a plurality of, for example four, adsorption units 62 in which trace gas components, such as hydrogen sulfide and ammonia, are separated and removed from the fuel gas which is forwarded through a transfer tube (an outlet pipe of the dust collector) 61 from the dust collector 5. The inside of each adsorption tower 62 is filled with an adsorbent capable of selectively adsorbing trace gas components, such as hydrogen sulfide and ammonia. The trace gas components are separated and removed as the fuel gas passes through these adsorption towers 62. This process of separation and removal basically consists of repeating the steps of adsorption, pressure equalization, desorption and pressurization, and each adsorption tower is operated by batch.

The outlet of the gas separation apparatus 6 is connected with a fuel gas holder 63 for ensuring the flow of the fuel gas without fluctuation to the combustor 9 (see FIG. 1) of the gas turbine 8. The fuel gas is forwarded from this holder 63 through a transfer tube (the inlet pipe of the gas turbine) 64 to the combustor 9 of the gas turbine 8.

Further, trace gas components, such as hydrogen sulfide and ammonia, which are adsorbed by the adsorbent in each adsorption tower are separated from the adsorbent in the steps of pressure equalization and desorption, and go through a gas cooler 65, and are stored in a separated gas holder 66. Then these gas components are supplied to a gas disposal apparatus 7 through the transfer tube 67 as illustrated in FIG. 1. In FIG. 2, a vacuum pump 68 is used to desorb the gas, but the separation can also be carried out by pressure reduction using differences between the pressure of the fuel gas and the atmospheric pressure.

Figure 3:
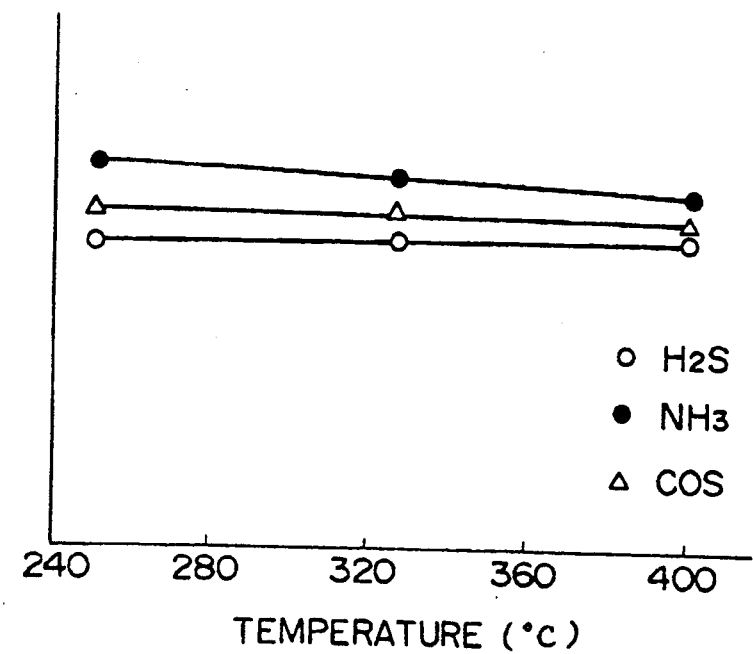
FIG. 3 is a graph showing the efficiency of separating $H_2S$, $NH_3$ and COS.

The above-mentioned pressure swing adsorption, wherein gases are separated under high pressures and at high temperatures, is capable of removing no less than 95% of trace gas components, such as $H_2S$, $NH_3$, COS and HCN, from the fuel gas. FIG. 3 illustrates the temperature dependent efficiency of purifying a fuel gas which comprises CO, $CO_2$, $H_2$, $H_2O$, $N_2$, $H_2S$, COS and $NH_3$ under a high pressure and at a high temperature, evidencing that no less than 95% of $H_2S$, COS and $NH_3$ can in fact be removed.

Referring to FIG. 1 again, the gas containing high concentrations of hydrogen sulfide, ammonia and the like is separated by the gas separation apparatus 6 and forwarded to the gas disposal apparatus 7 for disposal treatment, and discharged from the chimney 13 into the atmosphere after the treatment.

Figure 4:
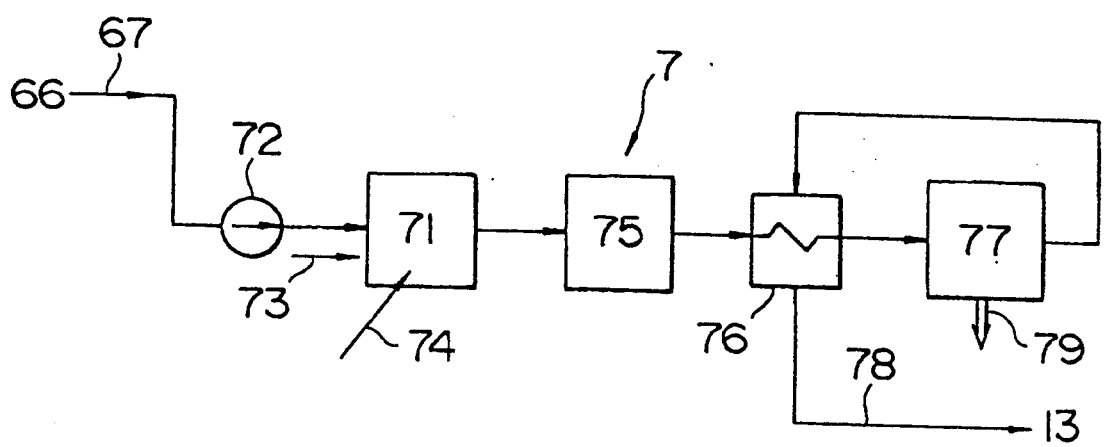
FIG. 4 is a diagram describing in detail the structure of a gas disposal apparatus 7 in FIG. 1.

The gas disposal apparatus 7 has a structure the detail of which is illustrated in FIG. 4, and comprises a combustion furnace 71. The gas containing high concentrations of hydrogen sulfide, ammonia and the like is forwarded from the separated gas holder 66 of the gas separation apparatus 6, as illustrated in FIG. 2, through the transfer tube 67 to the combustion furnace 71 with the aid of a blower 72. The gas is then subjected to combustion along with air 73 and an auxiliary fuel 74 supplied. The combustion gas passes through a dry denitration apparatus 75, a gas/gas heat exchanger 76 and a cleanup apparatus 77, such as a wet desulfurization apparatus, and sulfur oxides and nitrogen oxides it contains are reduced. Then the combustion gas is discharged into the atmosphere through a waste gas duct 78 and the chimney 13 as illustrated in FIG. 1.

Also, reference numeral 79 in FIG. 4 refers to a byproduct. Although FIG. 4 shows the case where a wet cleanup apparatus 77 is used, it may be replaced by a dry cleanup apparatus, such as a dry desulfurization apparatus, which is used with ordinary boilers. Furthermore, the auxiliary fuel 74 to be supplied to the combustion furnace 71 may be replaced by a combustion gas which the separated gas accompanies. Moreover, the dry denitration apparatus may be dispensed with depending upon environmental and other conditions.

The carbon-containing fuel 2 to be supplied to the gasification apparatus 1 as illustrated in FIG. 1 may be in the form of either solids (fine powder, coarse particle powder or slurry) or liquids, while the oxygen-containing gas 3 can be any of air 16 extracted from the gas turbine, oxygen supplied by an oxygen manufacturing plant (not shown) or an oxygen-enriched air which is a mixture of this oxygen and the air 16.

While various different types of furnaces have been known in connection with the gasification apparatus 1, the present invention provides an apparatus which cleans up the gas at gas temperatures of 240° C. to 500° C., and which can be used with all types of furnaces except for the type of gasification apparatuses in which their furnace produces components with heavy consistency, such as tar, because such components may possibly precipitate as a liquid at the dust collector 5.

According to the present invention, while the heat efficiency is maintained at a high level of no less than 46% in terms of HHV at the generator terminal at a gasification-combined power plant, no less than 95% of trace gas components, such as hydrogen sulfide and ammonia, are removed from fuel gases, and as low as 1 to 2% or less of fuel gas is allowed to be mixed into separated gases.

Also, the denitration and the desulfurization can be performed very efficiently by oxidizing the separated gas containing high concentrations of hydrogen sulfides, ammonia and the like and by using conventional methods with proven results.

We claim:

1. A gasification-combined power plant which comprises:

a gasification apparatus for partially oxidizing a carbon-containing fuel with an oxygen-containing gas at a high temperature and under a high pressure;

a gas turbine driven by combustion of a high temperature fuel gas generated in said gasification apparatus; an exhaust heat recovery boiler for recovering heat from a high-temperature gas at an outlet of said gas turbine;

a steam turbine driven by steam produced by heat recovered respectively at said gasification apparatus and said exhaust heat recovery boiler;

a gas clean-up apparatus for purifying at a high temperature the high-temperature fuel gas generated by said gasification apparatus, said gas cleanup apparatus being positioned downstream from said gasification apparatus; a dust collector for removing char and dust from the fuel gas; and a gas separation apparatus for simultaneously removing substantially all of the trace gas components from the fuel gas by way of dry physical adsorption, said gas separation apparatus being positioned downstream from said dust collector, and comprising a plurality of adsorption towers with an adsorbent capable of selectively adsorbing trace gas components, a first conduit system to lead flue gas without trace gas components to a combustor of said turbine, and a second conduit system to lead trace gas components desorbed from said adsorbent to a gas disposal apparatus, wherein the dry physical adsorption of said gas separation apparatus is carried out with a pressure swing adsorption method in which trace gas components are adsorbed by said adsorbent using high pressure conditions at the gasification apparatus, and desorbed and removed therefrom by pressure reduction.

2. A gasification-combined power plant according to claim 1, wherein said gas cleanup apparatus has a gas disposal apparatus for disposing of a gas containing high concentrations of hydrogen sulfide, ammonia and the like which is separated and removed by said gas separation apparatus.

3. A gasification-combined power plant according to claim 2, wherein said gas disposal apparatus comprises a combustion furnace for burning a gas containing high concentrations of hydrogen sulfide, ammonia and the like forwarded from said gas separation apparatus along with air and an auxiliary fuel supplied thereto, a denitration apparatus and a desulfurization apparatus.

* * * * *